United States Patent
Haraden et al.

(10) Patent No.: US 10,310,998 B2
(45) Date of Patent: Jun. 4, 2019

(54) DIRECT MEMORY ACCESS WITH FILTERING

(71) Applicant: Microsoft Technology Licensing, LLC, Redmond, WA (US)

(72) Inventors: Ryan Haraden, Duvall, WA (US); Robert Shearer, Woodinville, WA (US); Matthew Tubbs, Redmond, WA (US); Adam Muff, Woodinville, WA (US); Ashish Gupta, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

(21) Appl. No.: 14/788,317

(22) Filed: Jun. 30, 2015

(65) Prior Publication Data
US 2017/0004092 A1     Jan. 5, 2017

(51) Int. Cl.
*G06F 13/36*     (2006.01)
*G06F 13/28*     (2006.01)
(Continued)

(52) U.S. Cl.
CPC .............. *G06F 13/28* (2013.01); *G06T 1/60* (2013.01); *H04N 5/217* (2013.01); *Y02D 10/14* (2018.01)

(58) Field of Classification Search
CPC .............................. G06F 12/1081; G06F 13/28
(Continued)

(56) References Cited

U.S. PATENT DOCUMENTS 6,097,855 A * 8/2000 Levien ................ H04N 1/3878
                                                    382/296
6,944,358 B2   9/2005 Morimoto et al.
(Continued)

FOREIGN PATENT DOCUMENTS

CN     101517597 A    8/2009
CN     102111615 A    6/2011

OTHER PUBLICATIONS

McBader, et al., "An FPGA Implementation of a Flexible, Parallel Image Processing Architecture Suitable for Embedded Vision Systems", In Proceedings of the International Parallel and Distributed Processing Symposium, Apr. 22, 2003, 5 pages.
(Continued)

*Primary Examiner* — Chun Kuan Lee
(74) *Attorney, Agent, or Firm* — Klarquist Sparkman, LLP

(57) ABSTRACT

Methods, apparatus, and computer-readable storage media are disclosed for applying filtering operations to data transferred as part of a direct memory access (DMA) operation. In one example of the disclosed technology, a system includes a processor, memory, and a direct memory access (DMA) engine coupled to the memory for reading a set of data from a selected range of read memory addresses for the memory without using the processor. A line buffer coupled to the DMA engine is configured to receive DMA read data and temporarily store a portion, but not all of the data set being read by the DMA engine in a line buffer. A digital filter is configured to apply a filtering operation to a windowed subset of the buffered portion of the data set, producing filtered data that is stored to a selected range of write memory addresses for the memory, without using the processor.

20 Claims, 11 Drawing Sheets

(51) Int. Cl.
  *G06T 1/60* (2006.01)
  *H04N 5/217* (2011.01)

(58) Field of Classification Search
  USPC .......................................................... 710/308
  See application file for complete search history.

(56) References Cited

U.S. PATENT DOCUMENTS

| | | | |
|---|---|---|---|
| 8,260,002 | B2 | 9/2012 | Almbladh |
| 8,359,411 | B2 | 1/2013 | Millet et al. |
| 8,458,377 | B2 | 6/2013 | Piccirillo et al. |
| 8,471,932 | B2 | 6/2013 | Cote et al. |
| 8,736,623 | B1 | 5/2014 | Lew et al. |
| 2011/0235936 | A1* | 9/2011 | Lin .................... G06K 9/00973 382/260 |
| 2012/0154640 | A1* | 6/2012 | Taoka ................ H04N 5/23229 348/240.99 |
| 2012/0203942 | A1 | 8/2012 | Yonemoto et al. |
| 2013/0064298 | A1 | 3/2013 | Jagannathan et al. |
| 2014/0201416 | A1 | 7/2014 | Dalal et al. |
| 2015/0310593 | A1* | 10/2015 | Kobayashi ............. G06T 5/002 382/275 |
| 2016/0180493 | A1 | 6/2016 | Haraden et al. |
| 2016/0180494 | A1 | 6/2016 | Haraden et al. |

OTHER PUBLICATIONS

Lince, Richard, "Live Capture with Parallel Processing", Published on: Jan. 16, 2014; Available at: http://www.datapath.co.uk/tbd/whitepapers/datapath_low_latency.pdf.

Nomura, et al., "Design of a Dataway Processor for a Parallel Image Signal Processing System", In Proceedings of SPIE 2501, Visual Communications and Image Processing, Apr. 21, 1995, 2 pages.

Singh, "Video Framework Considerations for Image Processing on Blackfin® Processors", In Proceedings of Engineer to Engineer Note 276, Sep. 2005. pp. 1-6.

Zinner, et al., "ROS-DMA: A DMA Double Buffering Method for Embedded Image Processing with Resource Optimized Slicing", In Proceedings of the Twelfth IEEE Real-Time and Embedded Technology and Applications Symposium, Apr. 4, 2006, 12 pages.

International Search Report and Written Opinion for PCT/US2016/037720, dated Feb. 22, 2017, 11 pages.

* cited by examiner

| Right Edge | 6 | 13 | 20 | 27 | 34 | Right Edge |
|---|---|---|---|---|---|---|
| | 5 | 12 | 19 | 26 | 33 | |
| Top Edge | 4 | 11 | 18 | 25 | 32 | Bottom Edge |
| | 3 | 10 | 17 | 24 | 31 | |
| | 2 | 9 | 16 | 23 | 30 | |
| | 1 | 8 | 15 | 22 | 29 | |
| Left Edge | 0 | 7 | 14 | 21 | 28 | Left Edge | ns in conjunction with applying a
DIRECT MEMORY ACCESS WITH FILTERING

BACKGROUND

Integrated circuit have benefitted from continuing gains in transistor count, integrated circuit cost, manufacturing capital, clock frequency, and energy efficiency due to continued transistor scaling predicted by Moore's law, with little change in associated processor Instruction Set Architectures (ISAs). However, the benefits realized from photolithographic scaling, which drove the semiconductor industry over the last 40 years, are slowing or even reversing. Reduced Instruction Set Computing (RISC) architectures have been the dominant paradigm in processor design for many years.

SUMMARY

Methods, apparatus, and computer-readable storage media are disclosed for performing direct memory access (DMA) memory operations in conjunction with applying a digital filter to the data as it is being transferred. Thus, data being transferred by the DMA operation can be filtered without extensive use of a CPU or GPU. By performing filtering operations (e.g. image filtering applied to digital images acquired with an image sensor) performance can be improved and/or energy usage reduced, while also allowing for processor resources to be applied to performing other operations.

In some examples, data to be filtered is stored in memory (e.g. static random access memory (SRAM), dynamic random access memory (DRAM), flash memory, video memory, or data from a masked storage device). In some examples, a line buffer is coupled to DMA read/write circuitry. The line buffer temporarily stores a number of rows of data, for example 3 or 5 rows, and outputs multiple rows of data in a first in/first out fashion. A digital filter is applied to a window of line buffer data, for example a 3×3 or 5×5 window of data, to apply a filter operation to a pixel at the center of the window. Filtered pixels are temporarily stored in an output buffer and then written to a memory or storage device using DMA write circuitry.

In some examples, a DMA controller includes a number of configuration registers that can be modified using DMA instructions executed by a processor. The DMA controller can also control configuration of the filter employed, by allowing selection of filter type and filter parameters to be applied to the data being transferred during a DMA operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

BRIEF DESCRIPTION OF THE DRAWINGS

FIG. 8 illustrates an example of edge controls, as can be used in certain examples of the disclosed technology.

DETAILED DESCRIPTION

I. General Considerations

Figure 1:
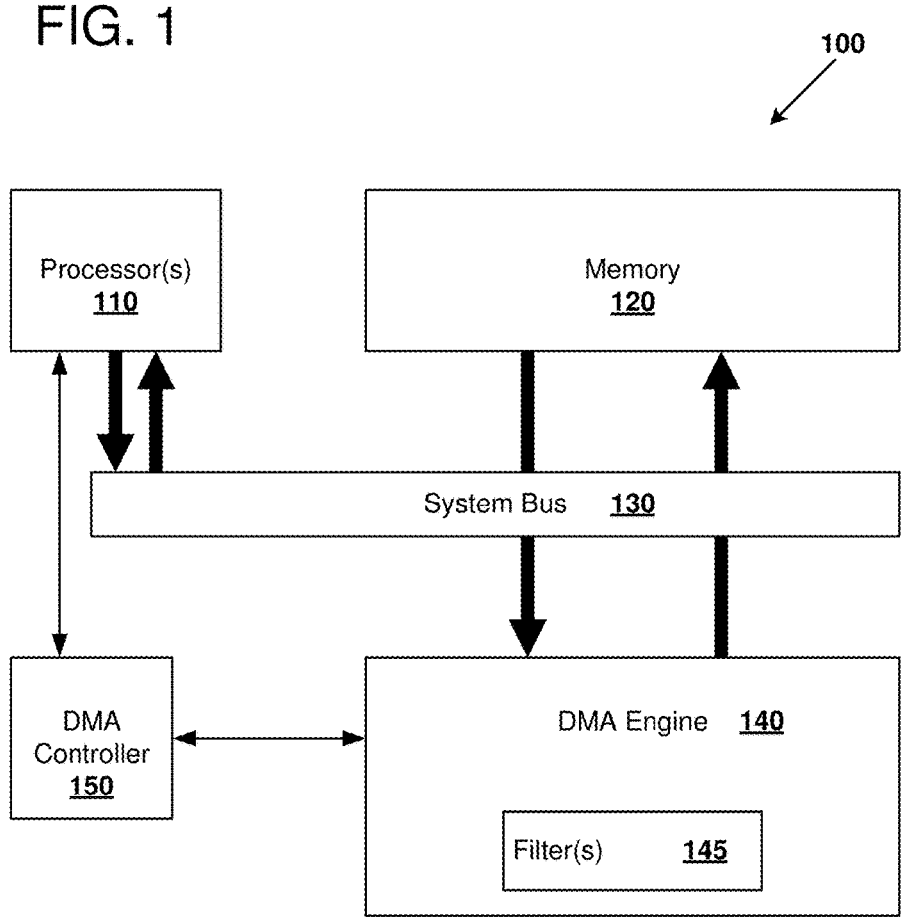
FIG. 1 is a block diagram that outlines an exemplary computing environment as can be used in certain examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application, or a software application that is accessed or downloaded via a web browser or other software application (such as a remote computing application). Such software can be executed, for example, on a single local computer (e.g., a thread executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technology

Methods and apparatus for incorporating filtering into DMA operations are disclosed. In some examples, by incorporating filtering into DMA operations, filtering can be introduced earlier in a processing pipeline, with improved performance over CPU-based methods. In some examples, low-power processing is achieved based at least in part on using a processing element to perform filtering operations in a low power mode while still maintaining acceptable performance. In some examples, after an image signal processor sends an incoming image into memory DMA transfer can be improved by filtering data during the DMA transfer. The DMA engine is not tied to the input rate (e.g., the input rate of a Mobile Industry Processor Interface (MIPI) interface) and thus power and performance tradeoffs are enabled. Because the data would have been transferred to a CPU anyway, the filtering is performed for lower power due to the reduced overhead of the transfer operation.

In some examples of the disclosed technology, additional operations are performed to handle pixels near the edge of an image, allowing decomposition of image data into tiles, and/or allow multi-channel operation.

III. Example Computing Environment with DMA Engine

FIG. 1 is a block diagram 100 outlining an exemplary computing environment in which certain apparatus and methods disclosed herein can be used. The computing environment outlined in FIG. 1 can be implemented in a single integrated circuit, or by coupling a number of different integrated circuits, including circuits having programmable logic devices, such as FPGAs.

As shown in FIG. 1, one or more processors 110 are coupled to memory 120 via a system bus 130. The memory 120 can be embedded or external to the integrated circuit on which the one or more processors 110 are located, and can be implemented using any suitable memory technology including, for example, static random access memory (SRAM), dynamic random access memory (DRAM), flash memory, video RAM, or other suitable memory technology. In some examples, the memory 120 includes computer-readable storage devices such as flash memory drives, hard drives, or other mass storage devices.

The system bus 130 can be implemented using any suitable communication technology, and includes connection topologies that allow multiple components to share the system bus, as well as other connection topologies where each pair of components communicates using a point-to-point bus. Examples of protocols suitable for implementing the system bus 130 in disclosed embodiments include DDR2, DDR3, DDR4, PCI, PCIe, I/OAT, AHB, or other suitable bus protocol.

Also shown in FIG. 1 is a DMA engine 140 including a filter 145 (e.g., a two-dimensional pixel filter). The DMA engine 140 can be used to read data from the memory 120 using the system bus 130, as well as to write data to the memory 120 using the system bus. The DMA engine 140 can read to and write from the memory 120 independently of any of the processors 110. Typically, a DMA controller 150 receives instructions from one or more of the processors 110 specifying memory operations to be performed by the DMA engine 140. For example, a DMA instruction will specify a starting address, an ending address, a stride width, element size, number of elements, and/or other suitable parameters for specifying a block memory move. The DMA controller 150 also includes configuration registers, which can be used to configure one or more of the filters 145 accessible by the DMA engine 140. For example, any of the DMA instruction parameters can be stored in corresponding configuration registers prior to executing a DMA instruction.

The filter(s) 145 can implement any suitable filtering technique, for example, by filtering a pixel of interest based on surrounding pixels within a two-dimensional window. For example, a 3×3 or 5×5 window of pixels surrounding a respective pixel of interest, can be used as input to the filter.

Examples of suitable filters to be applied to a window of data for a pixel include linear and nonlinear filters. Examples of suitable filtering techniques implemented by the filter(s) 145 include bilateral filters, joint bilateral filters, convolution filter, finite impulse response filter, or other suitable filters. Control operations for filter can be implemented using any suitable computing hardware, including but not limited to, hardwired finite state machines, programmable microcode, programmable gate arrays, or other suitable control circuits. Functions applied by the filter(s) 145 can be implemented using digital logic, including integer arithmetic and logic units (ALUs), fixed point ALUs, floating point ALUs, shifters, rotators, multiplexers, crossbars, or other suitable logic. In some examples, logic hardware specific to filter operations, including integer, fixed point, and/or floating point adders, comparators, multipliers, dividers, and/or logic functions are utilized. In some examples, operation of execution units in the filter(s) 145 is pipelined using one or more pipeline registers, which allow for temporary storage of values in between individual clock cycles in a multi-cycle filter operation.

IV. Example Direct Memory Access (DMA) Engine

Figure 2:
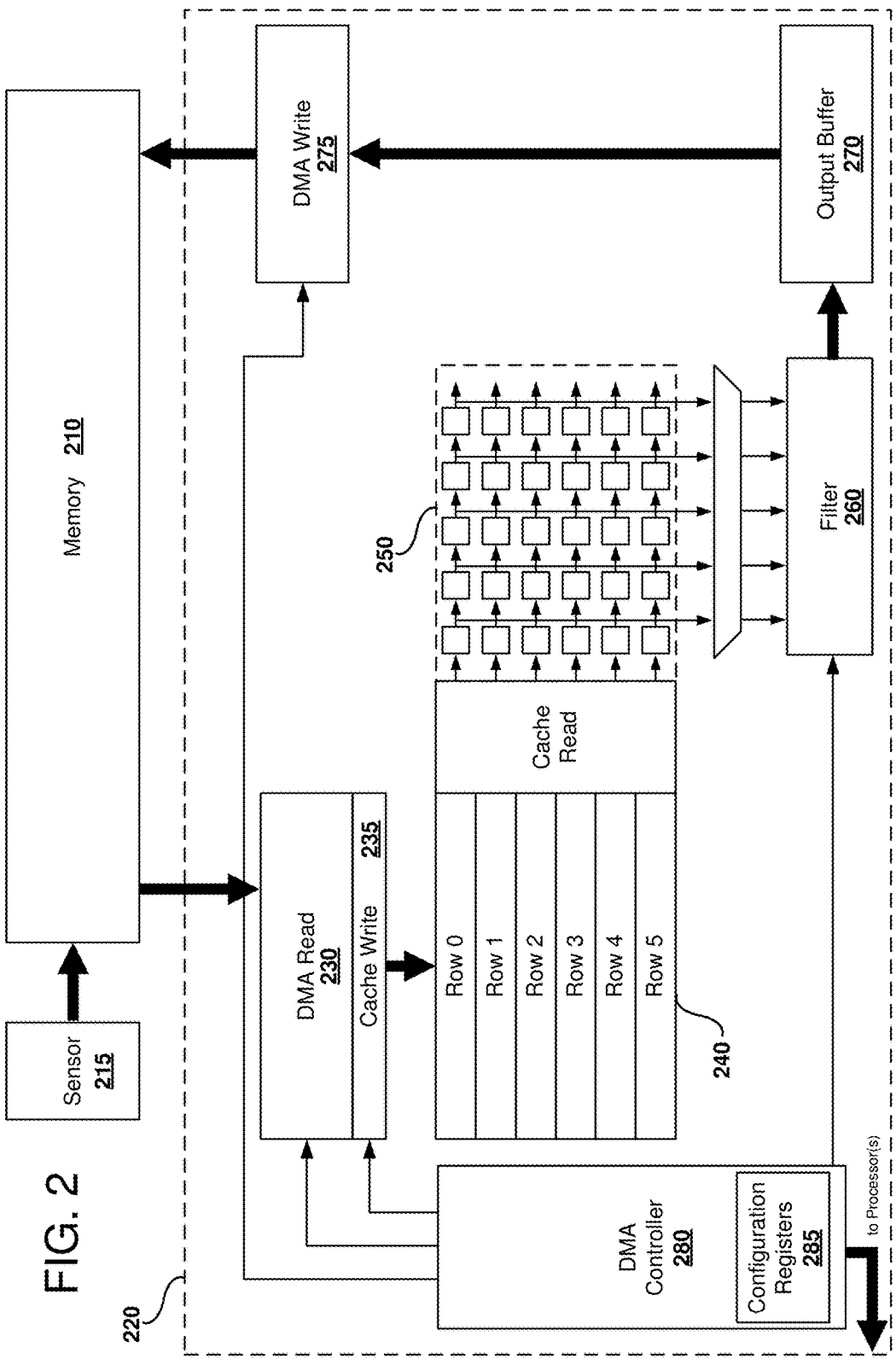
FIG. 2 is a block diagram that outlines an example DMA system as can be used in certain examples of the disclosed technology.

FIG. 2 is a block diagram 200 outlining an example DMA system as can be implemented in certain examples of the disclosed technology. For example, the illustrated DMA system can be included in the example computing environment of FIG. 1, in a single chip, multi-chip, SoC, or other suitable configuration.

As shown in FIG. 2, a memory 210 is coupled to an image sensor 215 and a DMA engine 220 using, for example, a multi-point or point-to-point bus. The memory 210 can be implemented, for example, using a combination of any one or more of the following technologies: static random access memory (SRAM), dynamic random access memory (DRAM), flash memory, video memory, or data from a masked storage device. In some examples, the memory 210 includes cache and/or virtual memory components.

The image sensor 215 can be implemented with a charge-coupled device (CCD), complementary metal oxide semiconductor (CMOS), or other image sensor technology. In some examples, the image sensor 215 is integrated on the same integrated circuit as other components of the DMA system, e.g., memory 210 and/or the DMA engine 220. In other examples, the image sensor 215 is located on a separate integrated circuit or a separate assembly. The image sensor 215 outputs data as a series of pixels, and can use 1, 2, 4, 8, 12, 16, 24, or another number of bits to represent intensity and color of an image captured using the image sensor. A number of different formats can be used, including RGB (red/green/blue), YUV (luma/chrominance) or other suitable format. In some examples, the pixels are not output from the image sensor 215 in the same order as physically arranged on the sensor and are swizzled to be arranged according to their physical order. In other examples, data processed using the DMA system is not captured with an image sensor, but is generated using other techniques (e.g., graphics rendered using a computer-based rendering program).

The DMA engine 220 includes a DMA read circuit 230 that can access blocks of data from a range of memory addresses for the memory 210. The DMA read circuit 230 generates control signals for controlling the memory bus and the memory 210, including, for example, read enable, read, address, and other control signals. The DMA read circuit 230 is coupled to cache write circuitry 235 that caches data read from the memory 210, which are written to a line buffer 240. The depicted line buffer 240 includes memory that can store six rows of data, for example, as rows of data for a two-dimensional image comprising pixels arranged by rows and columns, where each of the pixels has a color depth of one or more bits. Each of the rows has a fixed length (e.g. 256 bits) and can be read using cache read circuitry 248. The cache read circuitry 248 is configured to output data from one or more of the rows in a first-in/first-out fashion. It can be advantageous to configure the line buffer to have additional rows to allow fetching of a next plurality of rows as a current set of rows is being processed by the DMA engine 220. For example, if a window used to filter the line buffer data is sized 5×5, then one or more additional rows can be used to store data for the next row of an image stored in the memory 210, allowing for pipelining of data from memory.

A shift register 250 can be used to shift data out from multiple rows at a time. As shown in FIG. 2, the shift register 250 is five bits wide and six bits high. Thus, a window of data (e.g. a 3×3 or 5×5 windows of data) can be selected to be read from the line buffer 240 using the cache read circuitry and provided to a filter 260. The line buffer 240 of FIG. 2 includes an extra row than the window height of the filter, in order to allow reading of a next row of data while the current row of data is being processed.

The filter 260 can be implemented using any suitable technology, which includes hardwired logic, programmable logic, neural networks, or other suitable circuitry for filtering a window of data. Functions applied by the filter 260 can be implemented using logic for include integer arithmetic and logic units (ALUs), fixed point ALUs, floating point ALUs, shifters, rotators, multiplexers, crossbars, or other suitable logic. In some examples, logic hardware specific to filter operations, including integer, fixed point, and/or floating point adders, comparators, multipliers, dividers, and/or logic functions are utilized. In some examples, operation of execution units in the filter 260 are pipelined. In some examples, the filter 260 processes input data from the shift register 250 in a single cycle, while in other examples, the filter 260 processes the input data in complex, multi-cycle operation.

The filter 260 then calculates a filtered value for each pixel as a window is stepped through the rows of the line buffer 240. The filtered value for each filtered pixel is outputs in turn to an output buffer 270 (e.g., a 64×256-bit output buffer). In some examples, the output buffer 270 is sized based on the width of the line buffer 240 and the write block size supported by the DMA controller. For example, if DMA operations occur in 16-kilobit chunks, and the line buffer 240 is 256 bits wide, then a 64×256-bit output buffer can be employed. In some examples, a larger buffer can be employed, which can allow for one portion of the buffer to received filtered values while another portion of the buffer is being written to the memory 210. The output buffer can be implemented using any suitable storage technology, including using latches, flip-flops, static random access memory (SRAM), and/or dynamic random access memory (DRAM).

In some examples, pixels near an edge of data are copied (but not filtered), or processing is modified, because the surrounding pixel data available is less than the filter input size. For example, for a 3×3 filter, pixels corresponding to the first and last row/column of data are copied or processing otherwise modified. For a 5×5 filter, pixels corresponding to the first and last two rows/columns of data are copied or procession otherwise modified. In some examples, the modified data processing includes copying values from adjacent pixels that are available. Handling of such edge conditions is discussed in further detail below.

Data from the output buffer 270 is in turn provided to DMA write circuitry 275, which stores filter pixel data in the memory 210. The DMA write circuitry 275 generates control signals for controlling the memory bus and the memory 210, including, for example, write enable, write, address, and other control signals.

Also shown in FIG. 2 is a DMA controller 280 which includes a number of configuration registers 285. The DMA controller 280 can be accessed by one or more of the processors using appropriate instructions. In some examples of the disclosed technology, the processors include special instructions for using the DMA controller. In other examples, the DMA controller can be accessed using reads and writes to designated portions of memory, for example, in a memory-mapped fashion. The DMA controller 280 can be used to configure the start address and end address of a block of memory for performing a DMA read/write operation. The DMA controller 280 can also be used to configure operation of the filter, including selection of filter type, as well as parameters for the filter.

Thus, the system illustrated in the block diagram 200 allows for processing of large blocks of data stored in the memory 210 using a subset of the data temporarily stored in the line buffer 240. Further, filtering operations that operate within a small region surrounding a pixel of data can also operate efficiently, because only a small number of pixels is accessed by the filter 260 at any point in time.

V. Example DMA Filtering Operation

Figure 3:
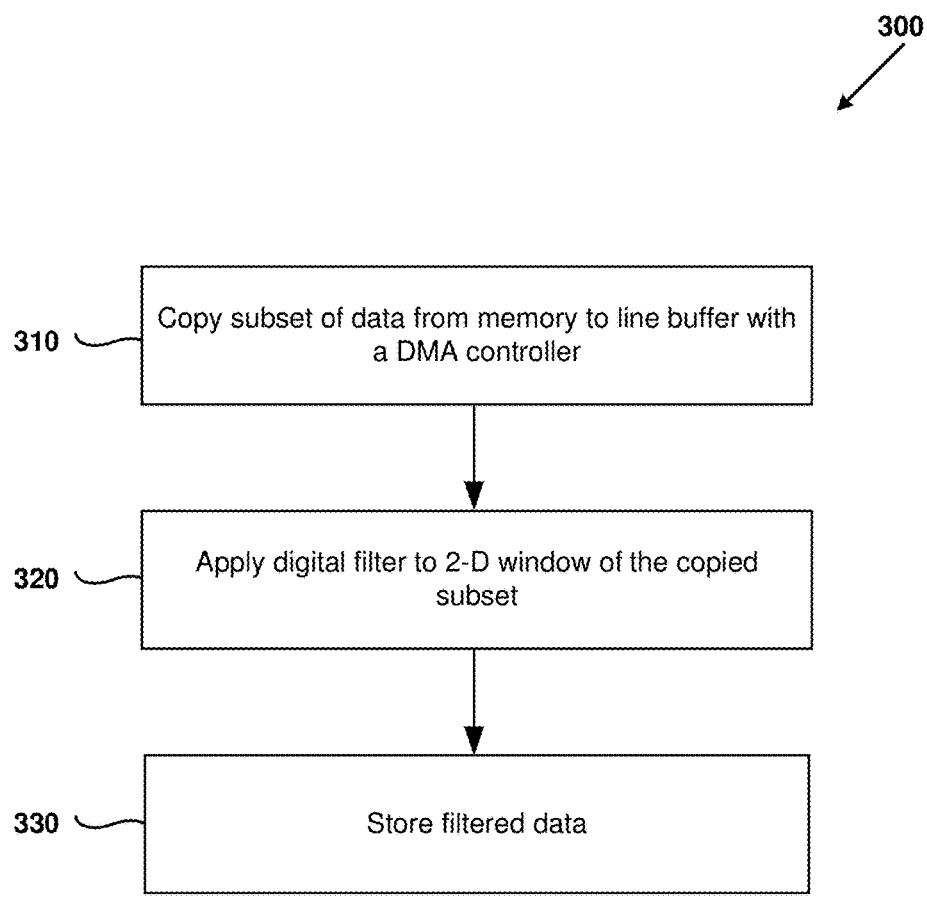
FIG. 3 is a flow chart outlining an example method of direct memory access with filtering, as can be performed in certain examples of the disclosed technology.

FIG. 3 is a flow chart 300 outlining an example method of performing direct memory access with filtering, as can be performed in some examples of the disclosed technology. The computing environment depicted in FIG. 1, and the DMA system depicted in FIG. 2, are examples of hardware components that can be applied to perform the method of FIG. 3, although these examples are not limiting, and other suitable hardware can be used.

At process block 310, a subset of data is copied from memory to a line buffer using a DMA controller. The subset of data can include at least a number of rows of data that will be input to a filter (e.g., the height of a filter window used to filter the data).

Figure 4:
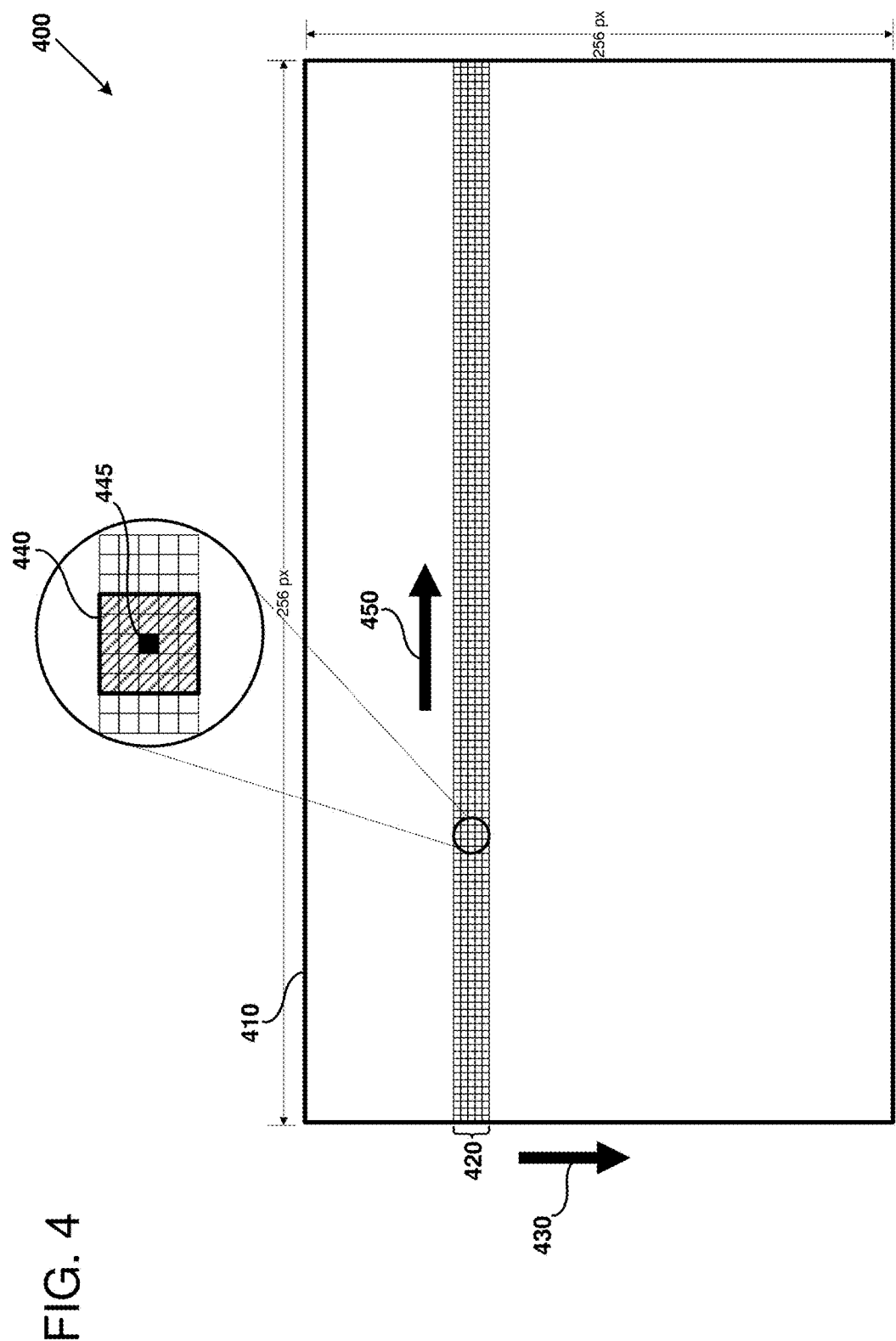
FIG. 4 illustrates an example of pixel processing, as can be performed according to the method of FIG. 3.

FIG. 4 is a schematic representation 300 of a DMA filtering operation, as can be performed in certain examples of the disclosed technology. As shown in FIG. 4, a set of image data 410 is stored in memory that is 256 pixels (px) wide by 256 pixels high. For example, the set of image data 410 can be obtained using an image sensor. The image data 410 is being processed using a DMA filtering operation as disclosed herein. A subset of the data 420 is read from the memory storing the complete set of image data 410 and stored in a line buffer, in an order corresponding to the arrangement of pixels in the corresponding image. The subset of data 420 includes 5 rows of data: 256 pixels wide and 5 pixels high. The remainder portion of the image 410 being processed is not currently stored in a line buffer. Pixels of the image 410 will be stored in the line buffer in a sequential order indicated by the arrow 430. Once processing of a new pixel row begins, a window of the data is output to a filter for performing a filter operation. As shown, a current pixel window 440 is 5×5 pixels in size. The pixel window includes 24 pixels that surround a current pixel of interest (indicated by cross-hatching) and the pixel of interest itself 445, which is depicted as solid black. Once the subset of data has been copied to the line buffer, the method proceeds to process block 320.

At process block 320, a digital filter is applied to a two-dimensional window of the subset of data. For example, data for all of the pixels in the current pixel window 440 can be shifted out of the line buffer using a shift register and provided to a digital filter. Thus, the set of surrounding pixels and the pixel of interest 445 (the pixel currently being processed) are provided to a digital filter. Filters such as those described above (e.g., filter 145 or filter 260) can be applied to filter the data. Once a window of pixel data has been filtered, the method proceeds to process block 330, and the window moves one pixel to the right, in the direction indicated by the arrow 450. The filtering process can be performed for a number of pixels, and the resulting data stored in an output buffer. Once the output buffer stores enough filtered pixel data (e.g., enough data for a DMA write operation), the method proceeds to process block 330.

At process block 330, the filtered pixels in the output buffer are stored to the memory locations specified by the corresponding DMA instruction (e.g., based on parameters stored in DMA configuration registers). Thus, a filter, such as a 2-D image filter, can be applied to all pixels of the image 410 during a DMA filter operation, but only a relatively small portion of the data is stored in the line buffer or accessible to the filter at any given point in time.

VI. Example Processing of Pixel Windows

Figure 5:
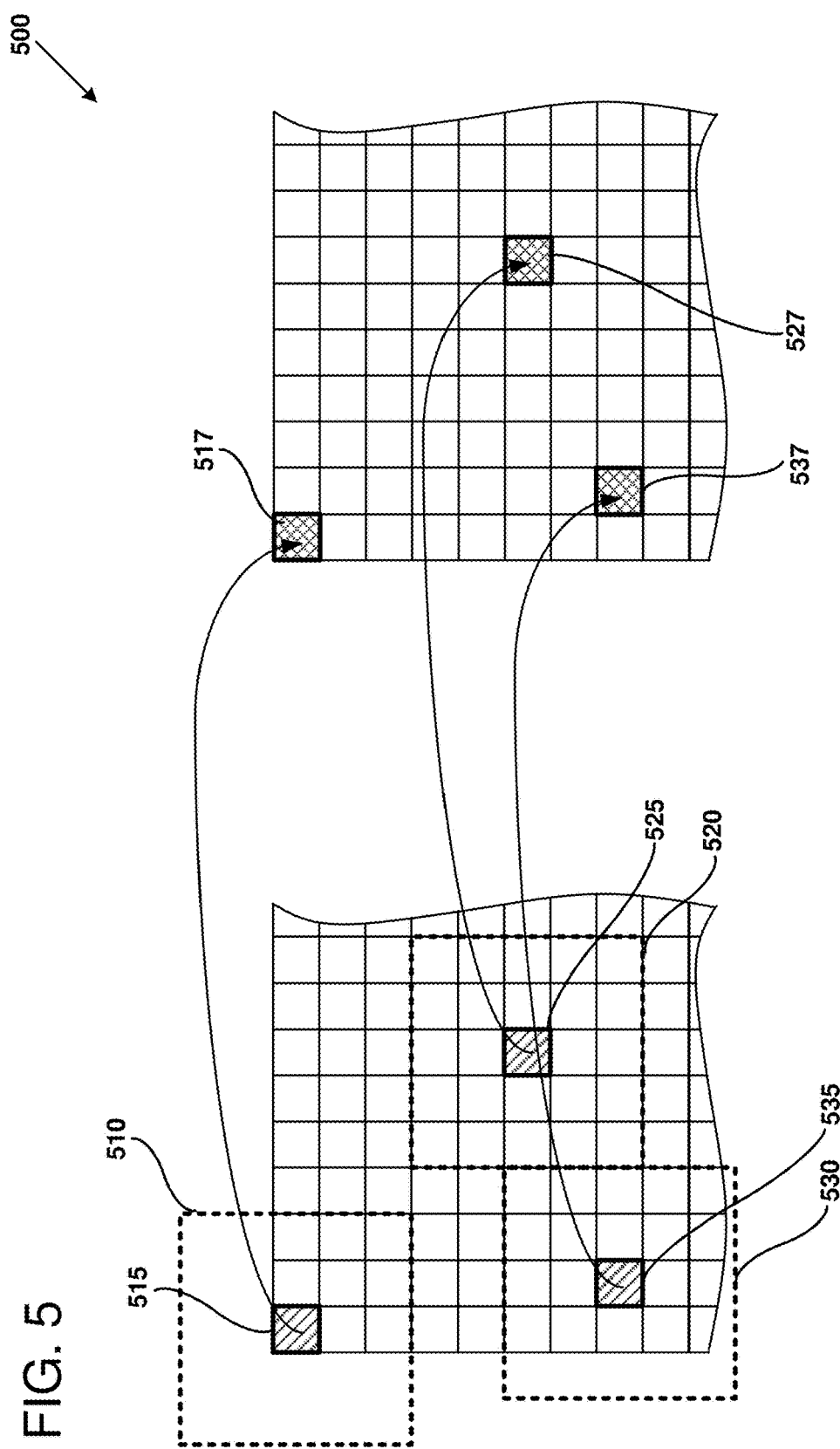
FIG. 5 further illustrates details of pixel processing, as can be performed according to the method of FIG. 3.

FIG. 5 is a diagram 500 that illustrates three pixel windows 510, 520, and 530 near the edge of a set of image data as a top row of pixel data is being processed. For example, the diagram 500 illustrates filtering of pixel data as can be performed according to the method outlined in FIG. 3. Only a relatively small portion of the image is depicted, for ease of explanation.

As shown in FIG. 5, a first pixel of interest 515 is in the top left corner of an image. Thus, there are only eight pixels within the window 510 that could be applied in a filtering operation to produce the filtered pixel 517.

In some examples, the filtered pixel 517 is generated by copying its corresponding pixel 515 from the line buffer, without applying filtering. In some examples, substitute pixels are generated to stand in for the missing pixels past the edge. For example, pixel intensity values for the first pixel are copied as if the missing pixels contained the same pixel intensity value. In some examples, values for the surrounding pixels are combined (e.g., by averaging) and copied to the filter as if the missing pixels contained the averaged values. In some examples, values for the surrounding pixels are generated randomly, or to predetermined values.

In contrast, a second pixel of interest 525 is surrounded by 24 pixels within its 5×5 pixel window 520. Thus, a filtered pixel 527 corresponding to the second pixel of interest 525 can be generated, without the edge condition handling discussed above regarding the first pixel of interest 515.

A third pixel of interest 535 is located within a third window 530. The third pixel of interest 535 includes 19 surrounding pixels that can be used to generate the filtered pixel 537. However, a number of locations within the third window 530 are located past the edge of the image, and will have edge handling applied accordingly. Similar techniques as discussed for the first pixel 515 can be used, although only 5 pixels are missing past the edge of the data. Further, it should be noted that in the case of a 3×3 filter, the third pixel 535 would not have edge processing applied.

Further, it should be understood that while absolute edges of an image are one situation that edge handling can be applied to, that other such situations exist. For example, larger images can be partitioned into a number of tiles (e.g., according to the line buffer size employed), and edge handling applied to edges thus created at tile boundaries, as further discussed below regarding FIGS. 6-8.

VII. Example of Tile-Based Pixel Processing with Edge Processing

Figure 6:
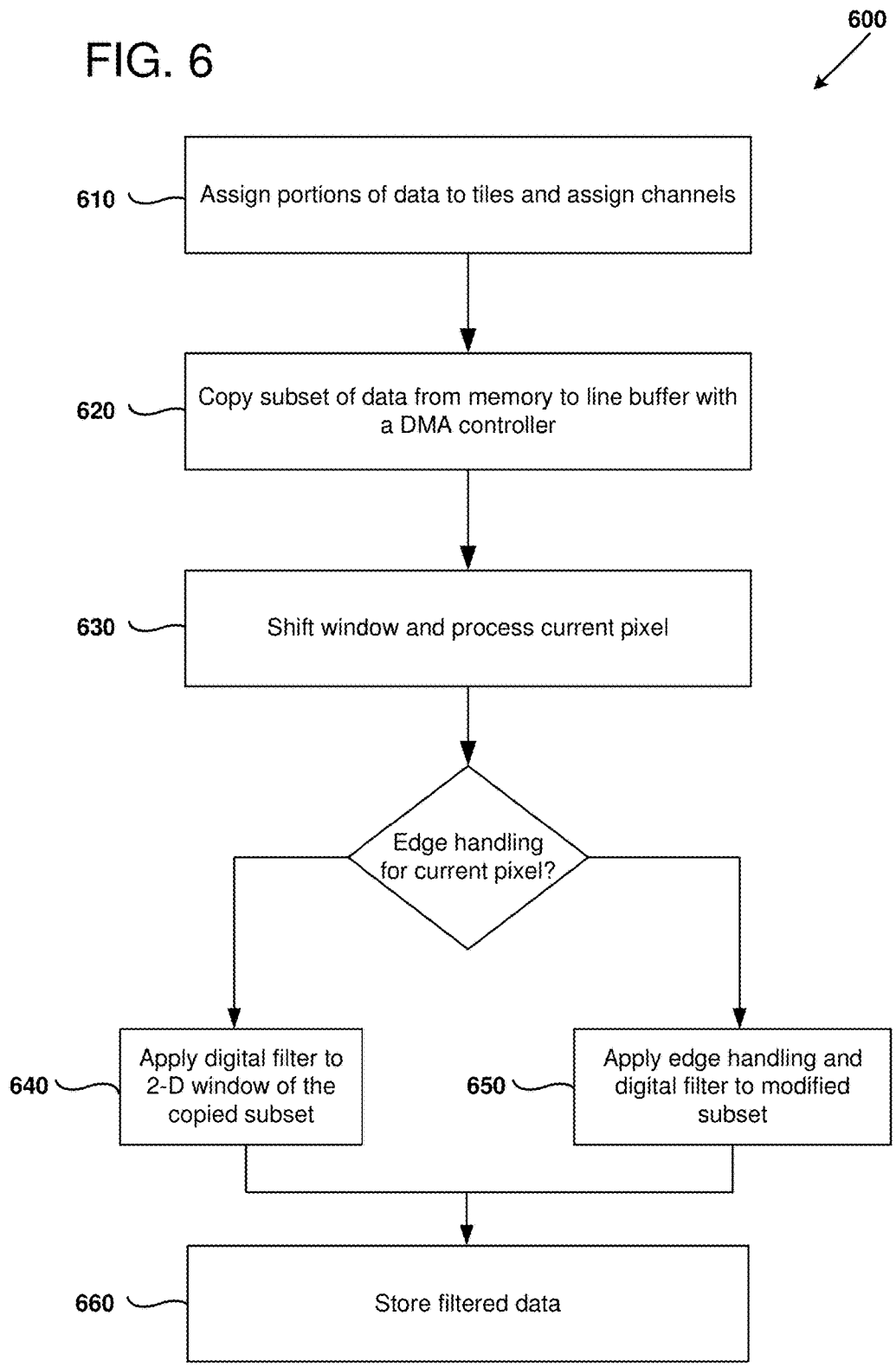
FIG. 6 is a flow chart outlining an example method of direct memory access with filtering and edge handling, as can be performed in certain examples of the disclosed technology.

FIG. 6 is a flow chart 600 outlining an example method of filtering data as can be practiced in some examples of the disclosed technology. The computing environment depicted in FIG. 1, and the DMA system depicted in FIG. 2, are examples of hardware components that can be applied to perform the method of FIG. 3, although these examples are not limiting, and other suitable hardware can be used.

At process block 610, portions of a data state stored in memory (e.g., image data stored in an SRAM or DRAM) are partitioned into a number of tiles of data. Each of the tiles of data can be assigned to an independent DMA channel to allow for concurrent transfer and filtering of data, thereby increasing data throughput. In some examples, each of the tiles is assigned to a single channel, but the partitioning into tiles allows for smaller width line buffers and/or output buffers to be employed.

Figure 7:
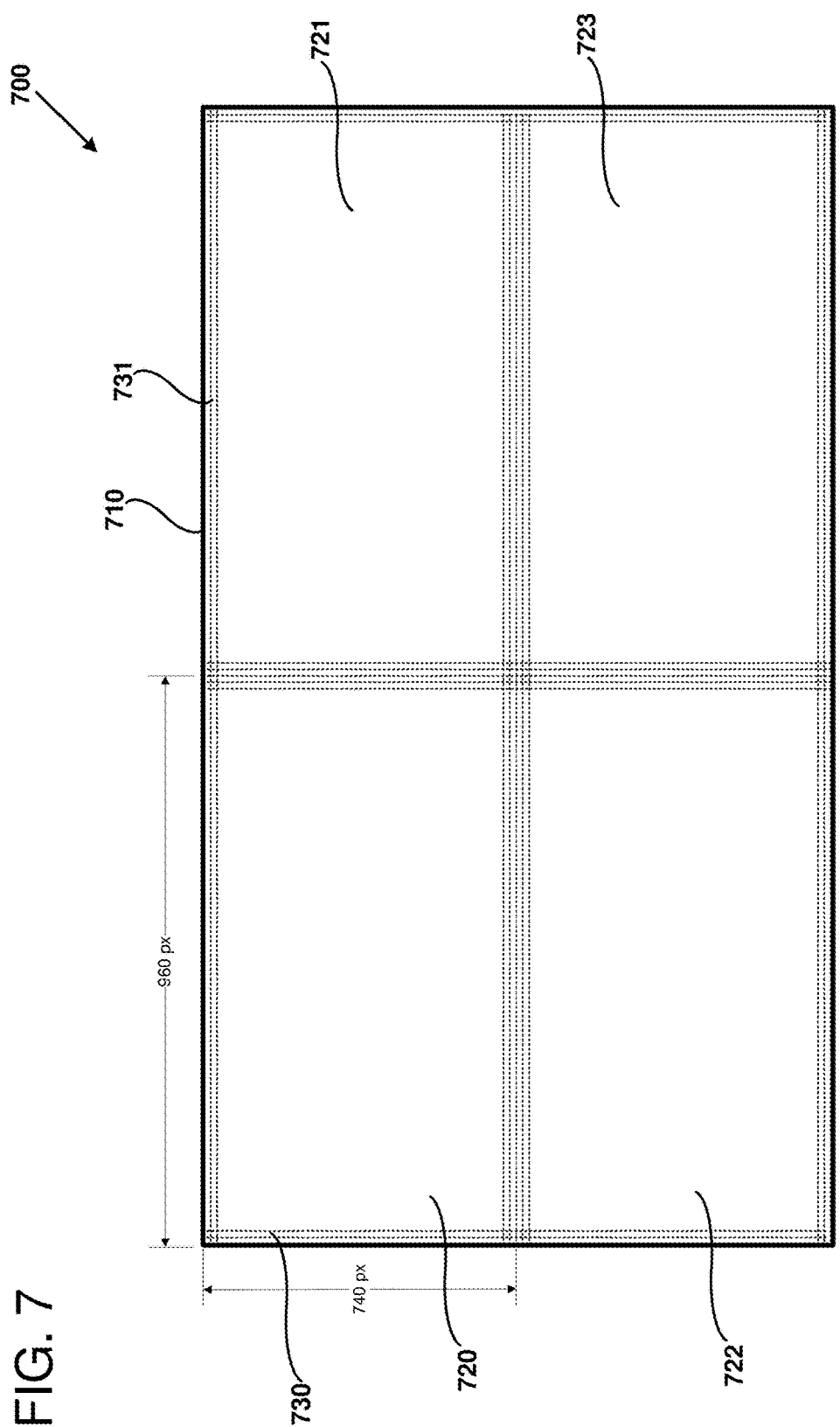
FIG. 7 illustrates an example of pixel processing using tiles, as can be performed according to the method of FIG. 6.

FIG. 7 is a diagram 700 illustrating a 1920×1080 pixel set of image data 710. For example, the image data can be generated using an image sensor, as discussed in further detail above. As shown in FIG. 7, the image data 710 has been partitioned into four tiles 720, 721, 722, and 723, each tile of which is 960×540 pixels in size. As illustrated, each of the tiles 720 through 723 will be processed using a separate set of DMA filter operations. Dividing the image data 710 into tiles can be desirable for a number of reasons. For example, by dividing the image data 710 into four tiles, 720-723, a smaller width line buffer can be used, since the line buffer only stores one-half width (960 pixels) of the entire width (1920 pixels) of the image data 710. Further, an output buffer and/or DMA write block transaction size is reduced, as the total amount of data in a tile is one-fourth the data in the complete image data 710. In addition, dividing the image data 710 into four tiles allows for multi-channel operation. In other words, two tiles of data can be processed using two separate DMA channels, concurrently, to roughly double throughput. Similarly, employing a four-channel DMA system would allow the overall system to roughly quadruple throughput.

Each of the tiles also includes a number of edges which can be handled using edge handling techniques disclosed herein. As shown in FIG. 7, there are a number of edge pixels (e.g., left edge pixel column 730 and top edge pixel row 731) located at the image data 710 boundaries. There are also a number of internal edge boundaries (e.g., vertical edge pixel column 740 and horizontal edge pixel row 741) that are located at tile boundaries. The handling of pixels at internal edge boundaries presents a similar issue as the image data boundaries, if the pixels lie beyond the edge of the width of the line buffer employed. After the tiles have been assigned, the method proceeds to process block 620.

At process block 620, a subset of each tile being processed (depending on whether multi-channel processing is being employed) is copied from memory to a line buffer using a DMA controller. This processing is similar to the processing discussed above regarding process block 310. After a sufficient number of rows to begin filtering have been copied, the method proceeds to process block 630.

At process block 630, the current pixel of interest and surrounding pixels (e.g., within a 3×3 or 5×5 window, as discussed above regarding process block 330) are output for processing by a digital filter. In some examples, a shift register is used to shift data out of the line buffer. Based on whether the current pixel is an edge pixel, the method will determine whether edge handling is needed. If edge handling is not needed, the method proceeds to process block 640.

At process block 640, a digital filter is applied to the current data in a similar manner as discussed above regarding process block 320. After the digital filter is applied, the method proceeds to process block 650.

At process block 650, edge handling is applied to allow for filtering of the current edge pixel. In some examples, the filtered version of the current pixel is generated by copying its corresponding pixel from the line buffer output, without applying filtering. In some examples, substitute pixels are generated to stand in for the missing surrounding pixels past the edge. For example, pixel intensity values for the first pixel are copied as if the missing pixels contained the same pixel intensity value. In some examples, values for the surrounding pixels are combined (e.g., by averaging) and copied to the filter as if the missing pixels contained the averaged values. In some examples, values for the surrounding pixels are generated randomly, or to predetermined values.

Regardless of whether edge handling was applied at process block 650, or a digital filter was applied to the data without edge handling at process block 640, once a sufficient number of pixels are stored in an output buffer, the method proceeds to process block 660.

At process block 660, a block of filtered pixel data is stored in memory by writing out filtered pixels stored in the output buffer using a DMA controller write operation. In some examples, it is advantageous to select the size of the output buffer based on the size of the DMA write operation that will be performed. Hence, a local 2-D filter can be applied to data during DMA transfer, without requiring processing by processors with the associated system.

VIII. Further Detailed Example of Edge Filtering

FIG. 8 is a diagram illustrating the use of controls in edge filtering for an example input frame. In particular, FIG. 8 depicts 35 pixels numbered 1-34 that are to be filtered with a 3×3 image filter. Also shown are the locations of the left edge, top edge, right edge, and bottom edge.

As shown in FIG. 8, a first descriptor or header will be applied to a relatively small subset of data for the image. The subset processed by the descriptor includes the columns that include pixels 0, 1, 2, 3, and 4. For the situation where a 3×3 pixel window is used, the first descriptor will filter pixels 8, 9, 10, 15, 16, 17, 22, 23, and 24, but not pixels in the single-pixel wide edge rows and columns. The first descriptor will in turn substitute the left edge pixels for pixels, 0, 7, 14, 21, and 28; the top edge pixels for pixels 1, 2, 3, and 4, and the bottom edge pixels for pixels 29, 30, and 31. For the situation where a 5×5 pixel window is used, the first descriptor will filter only pixels 16, 17, and 18 for the subset, because the edge rows and columns are two pixels wide. In some examples, the substitute pixels are copies of the nearest pixels. In other examples, a predetermined value is used as the substitute pixel value. The first descriptor does not output right edge pixel information.

A second descriptor will process the columns that include pixels 3, 4, 5, and 6. For the situation where a 3×3 pixel window is used, the second descriptor will filter pixels 11, 12, 18, 19, 25, and 26. The second descriptor will output pixels where the first descriptor ended. Thus, the second descriptor will substitute the right edge pixels for pixels, 6, 13, 20, 27, and 34; the top edge pixels for pixels 5 and 6, and the bottom edge pixels for pixels 32 and 33. For the situation where a 5×5 pixel window is used, the second descriptor will filter only pixel 18 for the subset. The descriptor will not output left edge information, and also does not process pixels that were already processed with the first descriptor.

IX. Example Computing System

Figure 9:
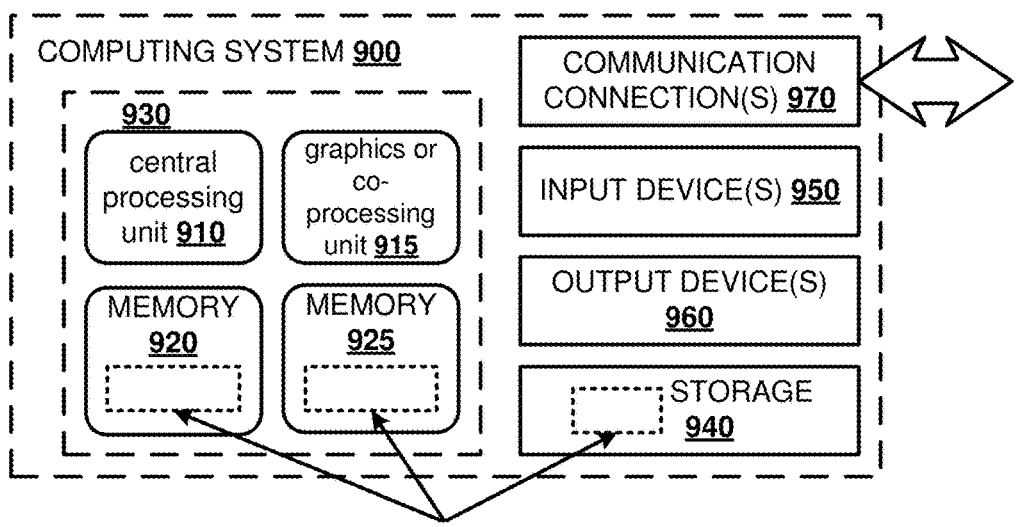
FIG. 9 is a diagram of an example computing system in which some described embodiments can be implemented.

FIG. 9 depicts a generalized example of a suitable computing system 900 in which the described innovations may be implemented. The computing system 900 is not intended to suggest any limitation as to scope of use or functionality, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions, including instructions for implementing direct memory access (DMA) with filtering disclosed herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), nonvolatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

X. Example Mobile Device

Figure 10:
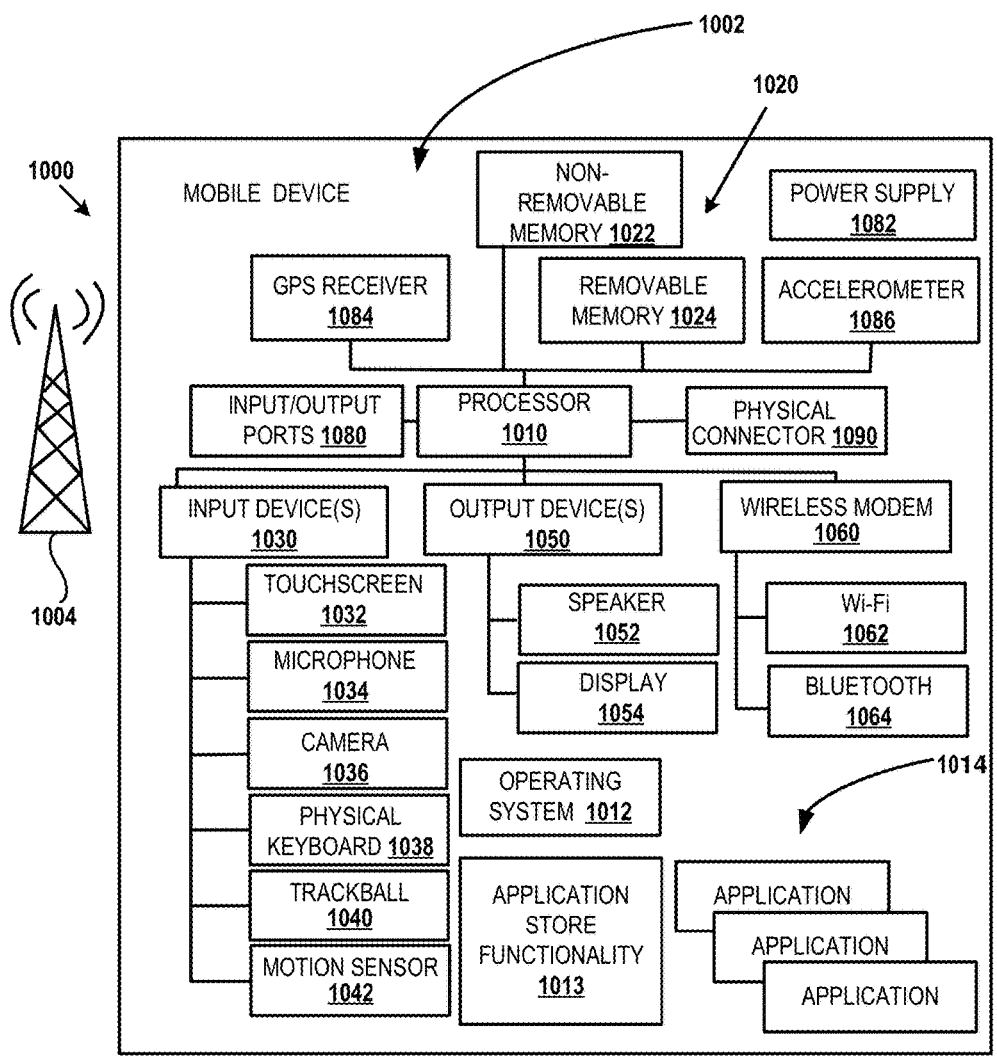
FIG. 10 is an example mobile device that can be used in conjunction with at least some of the technologies described herein.

FIG. 10 is a system diagram depicting an example mobile device 1000 including a variety of optional hardware and software components, shown generally at 1002. Any components 1002 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1004, such as a cellular, satellite, or other network.

The illustrated mobile device 1000 can include a controller or processor 1010 (e.g., signal processor, microprocessor, ASIC, or other control and processing logic circuitry) for performing such tasks as signal coding, data processing, input/output processing, power control, and/or other functions, including instructions for implementing DMA with filtering disclosed herein. An operating system 1012 can control the allocation and usage of the components 1002 and support for one or more application programs 1014. The application programs can include common mobile computing applications (e.g., email applications, calendars, contact managers, web browsers, messaging applications), or any other computing application. Functionality 1013 for accessing an application store can also be used for acquiring and updating application programs 1014.

The illustrated mobile device 1000 can include memory 1020. Memory 1020 can include non-removable memory 1022 and/or removable memory 1024. The non-removable memory 1022 can include RAM, ROM, flash memory, a hard disk, or other well-known memory storage technologies. The removable memory 1024 can include flash memory or a Subscriber Identity Module (SIM) card, which is well known in GSM communication systems, or other well-known memory storage technologies, such as "smart cards." The memory 1020 can be used for storing data and/or code for running the operating system 1012 and the applications 1014. Example data can include web pages, text, images, sound files, video data, or other data sets to be sent to and/or received from one or more network servers or other devices via one or more wired or wireless networks. The memory 1020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1000 can support one or more input devices 1030, such as a touchscreen 1032, microphone 1034, camera 1036, physical keyboard 1038, trackball 1040, and/or motion sensor 1042; and one or more output devices 1050, such as a speaker 1052 and a display 1054. Other possible output devices (not shown) can include piezoelectric or other haptic output devices. Some devices can serve more than one input/output function. For example, touchscreen 1032 and display 1054 can be combined in a single input/output device.

The input devices 1030 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3-D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1012 or applications 1014 can comprise speech-recognition software as part of a voice user interface that allows a user to operate the device 1000 via voice commands. Further, the device 1000 can comprise input devices and software that allows for user interaction via a user's spatial gestures, such as detecting and interpreting gestures to provide input to a gaming application.

A wireless modem 1060 can be coupled to an antenna (not shown) and can support two-way communications between the processor 1010 and external devices, as is well understood in the art. The modem 1060 is shown generically and can include a cellular modem for communicating with the mobile communication network 1004 and/or other radio-based modems (e.g., Bluetooth 1064 or Wi-Fi 1062). The wireless modem 1060 is typically configured for communication with one or more cellular networks, such as a GSM network for data and voice communications within a single cellular network, between cellular networks, or between the mobile device and a public switched telephone network (PSTN).

The mobile device can further include at least one input/output port 1080, a power supply 1082, a satellite navigation system receiver 1084, such as a Global Positioning System (GPS) receiver, an accelerometer 1086, and/or a physical connector 1090, which can be a USB port, IEEE 1394 (FireWire) port, and/or RS-232 port. The illustrated components 1002 are not required or all-inclusive, as any components can be deleted and other components can be added.

XI. Example Cloud-Supported Environment

Figure 11:
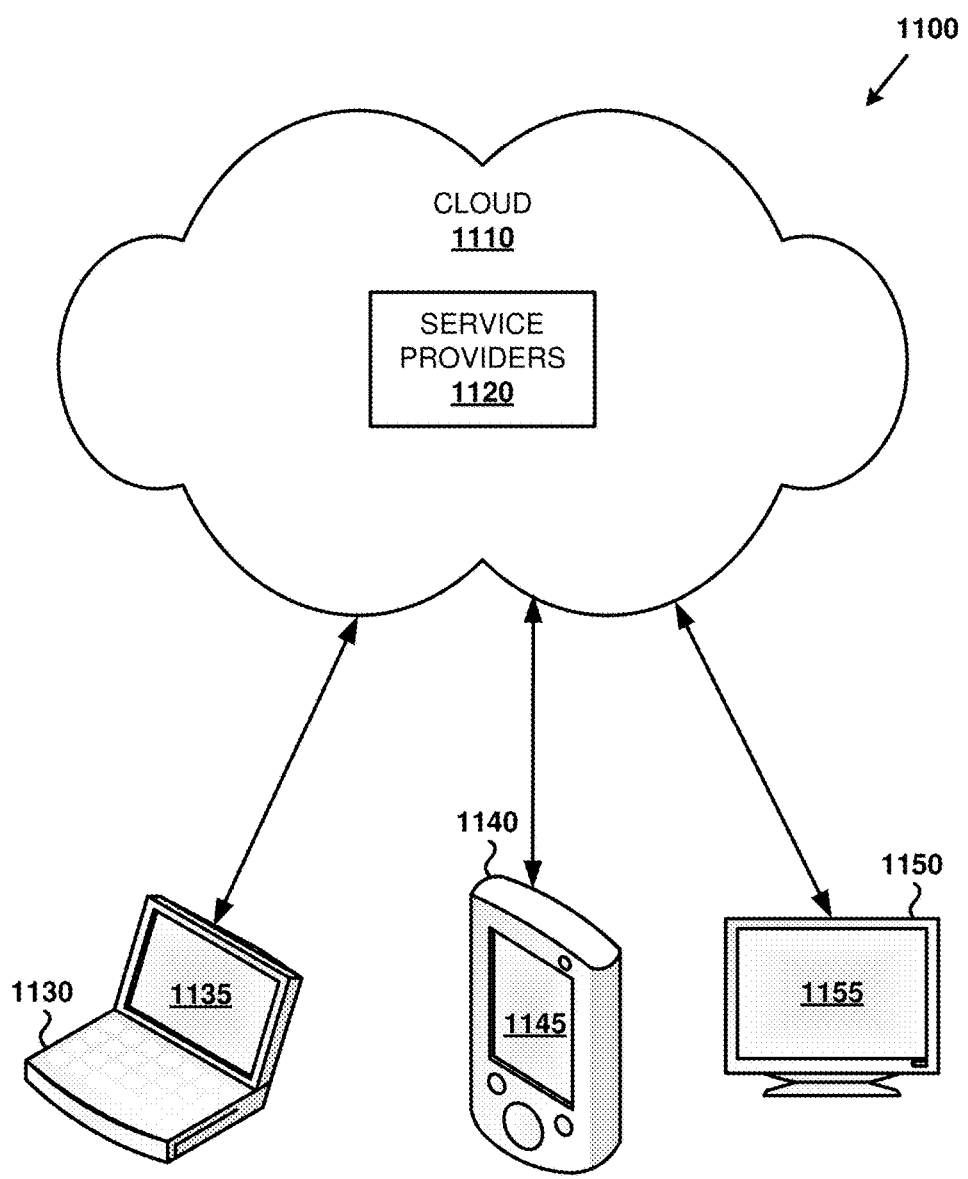
FIG. 11 is an example cloud-support environment that can be used in conjunction with at least some of the technologies described herein.

FIG. 11 illustrates a generalized example of a suitable cloud-supported environment 1100 in which described embodiments, techniques, and technologies may be implemented. In the example environment 1100, various types of services (e.g., computing services) are provided by a cloud 1110. For example, the cloud 1110 can comprise a collection of computing devices, which may be located centrally or distributed, that provide cloud-based services to various types of users and devices connected via a network such as the Internet. The implementation environment 1100 can be used in different ways to accomplish computing tasks. For example, some tasks (e.g., processing user input and presenting a user interface) can be performed on local computing devices (e.g., connected devices 1130, 1140, 1150) while other tasks (e.g., storage of data to be used in subsequent processing) can be performed in the cloud 1110.

In example environment 1100, the cloud 1110 provides services for connected devices 1130, 1140, 1150 with a variety of screen capabilities. Connected device 1130 represents a device with a computer screen 1135 (e.g., a mid-size screen). For example, connected device 1130 could be a personal computer such as desktop computer, laptop, notebook, netbook, or the like. Connected device 1140 represents a device with a mobile device screen 1145 (e.g., a small size screen). For example, connected device 1140 could be a mobile phone, smart phone, personal digital assistant, tablet computer, and the like. Connected device 1150 represents a device with a large screen 1155. For example, connected device 1150 could be a television screen (e.g., a smart television) or another device connected to a television (e.g., a set-top box or gaming console) or the like. One or more of the connected devices 1130, 1140, and/or 1150 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1100. For example, the cloud 1110 can provide services for one or more computers (e.g., server computers) without displays.

Services can be provided by the cloud 1110 through service providers 1120, or through other providers of online services (not depicted). For example, cloud services can be customized to the screen size, display capability, and/or touchscreen capability of a particular connected device (e.g., connected devices 1130, 1140, 1150).

In example environment 1100, the cloud 1110 provides the technologies and solutions described herein to the various connected devices 1130, 1140, 1150 using, at least in part, the service providers 1120. For example, the service providers 1120 can provide a centralized solution for various cloud-based services. The service providers 1120 can manage service subscriptions for users and/or devices (e.g., for the connected devices 1130, 1140, 1150 and/or their respective users).

XII. Additional Examples According to the Disclosed Technology

Additional examples are disclosed herein in accordance with the examples disclosed above.

In one example of the disclosed technology, a system includes memory, a direct memory access (DMA) engine coupled to the memory with a DMA read circuit being configured for reading a set of data from a selected range of read memory addresses for the memory, a buffer coupled to the DMA engine and configured to receive the read data and to temporarily store a portion but not all of the data set being read by the DMA engine as a buffered portion of the data set, a filter configured to apply a filtering operation to a subset of the buffered portion of the data set, producing filtered data. The DMA write circuit stores the filtered data to a selected range of write memory addresses for the memory.

In some examples, the system includes a processor having a plurality of processor registers, and the DMA read circuit reads the data set directly from memory without using the processor registers, and the DMA write circuit writes directly to the memory without using the processor registers. In some examples, the processor and the DMA engine are coupled to the memory with a multi-drop bus or a plurality of point-to-point busses. In some examples, the system includes an image sensor configured to detect an image and store image data corresponding to the image in the memory.

In some examples, the filter is a spatial domain filter being configured to apply at least one or more of the following filtering operations to the subset of the buffered portion of the data set: a bilateral filter, a joint bilateral filter, a convolution filter, finite impulse response filter, or other suitable filters. In some examples, the filter is further configured to apply the filtering operation to a 5×5 or a 3×3 pixel subset of the buffered portion of the data set. In some examples, the filter is further configured to skip filtering for one or more edge pixels of the set of data. In some examples, the filter is configured to provide substitute pixels for one or more edge pixels of the set of data prior to the filtering operation. In some examples, the data set comprises two or more tile regions, and the filter is further configured to skip filtering for one or more edge pixels near a boundary of two of the two or more tile regions.

In other examples of the disclosed technology, a system comprises memory or storage for storing image data acquired with an image sensor, one or more processors coupled to the memory or storage, a line buffer coupled to the memory or storage configured to, responsive to a direct memory access signal from the processors, read a plurality of rows of the image data from the memory or storage and output a window of two or more of the rows in first-in first-out order, and a digital filter configured to apply a two-dimensional filtering operation to the window of data output by the line buffer, producing filtered data that is stored in the memory or storage.

In some examples, the system includes a direct memory access (DMA) controller, a line buffer is coupled to the memory or storage via the DMA controller; and filtered data is stored in the memory or storage via the DMA controller. In some examples, the DMA controller is configured to read two or more channels of the stored image data from the memory and/or write two or more channels of the filtered data to the memory concurrently. In some examples, the system further includes a sensor configured to generate the image data stored in the memory.

In some examples, the image data includes edge pixels, and the filter is further configured to copy the edge pixels of the image data but not apply the two-dimensional filtering operation to the edge pixels. In some examples, the filter includes at least one or more of the following: a finite impulse response filter, an infinite impulse response filter, or a bilateral filter.

In other examples of the disclosed technology, a method of performing a direct memory access (DMA) operation with a DMA controller includes copying a subset of data from a memory or storage device coupled to the DMA controller to a line buffer, applying a digital filter operation to a two-dimensional window of the copied subset of the data, producing filtered data, and storing the filtered data in a memory or storage device.

In some examples, the method includes acquiring image data from an image sensor, the image data comprising the subset of the data. In some examples, the method includes producing the two-dimensional window for the digital filter operation by shifting data out of the line buffer. In some examples, the method includes storing values in configuration registers of the DMA controller, the values configuring operation of the DMA controller with respect to at least one or more of the following: size of the two-dimensional window, parameters for the digital filter operation, selection of a filter type for the digital filter operation, handling of edges of the subset of the data.

In some examples, a method includes compiling source code for a program and storing computer-readable instructions for a program executable by a processor coupled to the memory or storage device, the computer-readable instruction when executed by the processer, cause a system to perform any of the methods of performing a direct memory access (DMA) operation with a DMA controller disclosed herein.

In view of the many possible embodiments to which the principles of the disclosed subject matter may be applied, it should be recognized that the illustrated embodiments are only preferred examples and should not be taken as limiting the scope of the scope of the claims to those preferred examples. Rather, the scope of the claimed subject matter is defined by the following claims. We therefore claim as our invention all that comes within the scope of these claims.

We claim:

1. A system, comprising:
    memory;
    a direct memory access (DMA) engine coupled to the memory, the DMA engine including a DMA read circuit and a DMA write circuit, the DMA read circuit being configured for reading a set of data from a selected range of read memory addresses for the memory;
    a filter having a window height and being configured to apply a filtering operation to a window-height subset of a buffered portion of the data set, producing filtered data, the filter being further configured to provide substitute pixels for one or more edge pixels of the set of data prior to the filtering operation;
    a line buffer coupled to the DMA engine and configured to receive the read data and to temporarily store a portion but not all of the data set being read by the DMA engine as the window-height subset of the buffered portion of the data set, the line buffer including at least one more row of data than the window height; and
    wherein the DMA write circuit stores the filtered data to a selected range of write memory addresses of the memory.

2. The system of claim 1, further comprising a processor having a plurality of processor registers, and wherein the DMA read circuit is configured to read the data set directly from memory without using the processor registers, and wherein the DMA write circuit is configured to write directly to the memory without using the processor registers.

3. The system of claim 2, wherein the processor and the DMA engine are coupled to the memory with a multi-drop bus or a plurality of point-to-point busses.

4. The system of claim 2, further comprising an image sensor configured to detect an image and store image data corresponding to the image in the memory.

5. The system of claim 1, wherein the filter is a spatial domain filter, the filter being further configured to apply at least one or more of the following filtering operations to the subset of the buffered portion of the data set: a bilateral filter, a joint bilateral filter, a convolution filter, or a finite impulse response filter.

6. The system of claim 1, wherein the filter is further configured to apply the filtering operation to a 5×5 or a 3×3 pixel subset of the buffered portion of the data set.

7. The system of claim 1, wherein the filter is further configured to skip filtering for one or more edge pixels of the set of data.

8. The system of claim 1, wherein the data set comprises two or more tile regions, and wherein the filter is further configured to skip filtering for one or more edge pixels near a boundary of two of the two or more tile regions.

9. A method comprising:
with a line buffer, receiving data from a direct memory access (DMA) read circuit coupled to a memory for a selected range of read memory addresses for the memory and temporarily storing a portion but not all of the received data as a window-height subset of the received data;
providing substitute pixels for at least one edge pixel of the window-height subset of data;
filtering the window-height subset with the substitute pixels, producing filtered data; and
storing the filtered data to a range of write memory addresses via a DMA write circuit.

10. The method of claim 9, wherein the memory is coupled to a processor having a plurality of processor registers, and wherein the DMA read circuit is configured to read the data directly from the memory without using the processor registers, and wherein the DMA write circuit is configured to write directly to the memory without using the processor registers.

11. The method of claim 9, further comprising using an image sensor to detect an image and store image data corresponding to the image in the memory.

12. The method of claim 9, wherein the filtering comprises spatial domain filtering, the filtering further comprising applying at least one of the following operations to the window-height subset: a bilateral filter, a joint bilateral filter, a convolution filter, or a finite impulse response filter.

13. The method of claim 9, wherein the filtering comprises applying a filtering operation to a 5×5 or a 3×3 pixel subset of the window-height subset.

14. The method of claim 9, wherein the data set comprises two or more tile regions, and wherein the filtering comprises performing skip filtering for one or more edge pixels near a boundary of two of the two or more tile regions.

15. An apparatus, comprising:
memory;
a direct memory access (DMA) engine coupled to the memory, the DMA engine including a DMA read circuit and a DMA write circuit, the DMA read circuit being configured to read a set of data from a selected range of read memory addresses for the memory;
a filter having a window height and being configured to apply a filtering operation to a window-height subset of a buffered portion of the data set, producing filtered data, the filter being further configured to copy pixel intensity values from neighboring pixels for one or more missing edge pixels of the set of data prior to the filtering operation;
a line buffer coupled to the DMA engine and configured to receive the read data and to temporarily store a portion but not all of the data set being read by the DMA engine as the window-height subset of the buffered portion of the data set, the line buffer including at least one more row of data than the window height; and
wherein the DMA write circuit stores the filtered data to a selected range of write memory addresses of the memory.

16. The apparatus of claim 15, further comprising an image sensor configured to detect an image and store image data corresponding to the image in the memory.

17. The apparatus of claim 15, wherein the filter is a spatial domain filter, the filter being further configured to apply at least one or more of the following filtering operations to the subset of the buffered portion of the data set: a bilateral filter, a joint bilateral filter, a convolution filter, or a finite impulse response filter.

18. The apparatus of claim 15, wherein the filter is further configured to apply the filtering operation to a 5×5 or a 3×3 pixel subset of the buffered portion of the data set.

19. The apparatus of claim 15, wherein the data set comprises two or more tile regions, and wherein the filter is further configured to skip filtering for one or more edge pixels near a boundary of two of the two or more tile regions.

20. The apparatus of claim 15, wherein the filter is further configured to copy the pixel intensity values by combining two or more surrounding pixels.

* * * * *